United States Patent
Shoko et al.

(10) Patent No.: US 6,586,362 B1
(45) Date of Patent: Jul. 1, 2003

(54) HYDROCARBON SOLVENT AND PRESSURE-SENSITIVE COPYING MATERIAL MADE WITH THE SAME

(75) Inventors: Toshikatsu Shoko, Yokohama (JP); Yasuo Togami, Kisarazu (JP)

(73) Assignee: Nippon Petrochemicals Company, Limited, Tokyo (JP)

( * ) Notice: Subject to any disclaimer, the term of this patent is extended or adjusted under 35 U.S.C. 154(b) by 95 days.

(21) Appl. No.: 09/831,062

(22) PCT Filed: Sep. 14, 2000

(86) PCT No.: PCT/JP00/06309
§ 371 (c)(1),
(2), (4) Date: May 4, 2001

(87) PCT Pub. No.: WO01/21563
PCT Pub. Date: Mar. 29, 2001

(30) Foreign Application Priority Data

Sep. 20, 1999 (JP) .......................... 11-264828

(51) Int. Cl.$^7$ .............................................. B41M 5/135
(52) U.S. Cl. ............................. 503/21; 503/215; 585/25; 585/469
(58) Field of Search ...................... 503/215, 213; 585/25, 469

(56) References Cited

U.S. PATENT DOCUMENTS

| | | |
|---|---|---|
| 1,908,190 A | 5/1933 | Scholkopf |
| 2,282,327 A | 5/1942 | Dreisbach |
| 2,981,765 A | 4/1961 | Fetterly |
| 3,043,886 A | 7/1962 | Serres, Jr. et al. |
| 3,702,886 A | 11/1972 | Argauer et al. |
| 3,709,979 A | 1/1973 | Chu |
| 3,758,403 A | 9/1973 | Rosinski et al. |
| 3,786,107 A | 1/1974 | Kuribayashi et al. |
| 3,790,471 A | 2/1974 | Argauer et al. |
| 3,832,449 A | 8/1974 | Rosinski et al. |
| 3,836,383 A | 9/1974 | Kiritani et al. |

(List continued on next page.)

FOREIGN PATENT DOCUMENTS

| | | |
|---|---|---|
| GB | 896864 | 5/1962 |
| GB | 1475973 | 6/1977 |
| GB | 1555728 | 11/1979 |
| JP | 46-10064 | 3/1971 |
| JP | 48-92114 | 11/1973 |
| JP | 48-92115 | 11/1973 |
| JP | 48-97858 | 12/1973 |
| JP | 49-31652 | 3/1974 |
| JP | 50-4049 | 1/1975 |
| JP | 55-113724 | 9/1980 |
| JP | 62-41656 | 9/1983 |
| JP | 1-180835 | 7/1989 |
| JP | 02134332 | 5/1990 |

OTHER PUBLICATIONS

Yamada et al., "Catalytic Decomposition of 1,1–diphenylethane," J. Chem. Soc. Jpn. Ind., Chem. Sect., 72, [7] (1969), pp. 1512–1515 (Abstract Only).

Walker, J., "Formaldehyde," ACS Monograph Series, Reinhold Publishing Corp., New York, pp. 436–437 (Year Not Available).

Climent et al., "Condensation of Formaldehyde with Benzene in the Presence HY Zeolites," Applied Catalysis, 51 (1989), pp. 113–125.

Primary Examiner—B. Hamilton Hess
(74) Attorney, Agent, or Firm—Hollander Law Firm, P.L.C.

(57) ABSTRACT

A hydrocarbon solvent comprising a fraction which is obtained by reacting styrene and cumene in the presence of an acid catalyst and contains 85% by weight or more of 1-phenyl-1-(p-isopropylphenyl)ethane and 5% by weight or less of total styrene dimers, and a pressure-sensitive copying material made using said solvent. The hydrocarbon solvent is inexpensive and excellent in dissolving power for dyes, color-developing rate and so forth, and is satisfactorily odorless.

6 Claims, 1 Drawing Sheet

U.S. PATENT DOCUMENTS

| | | |
|---|---|---|
| 3,926,782 A | 12/1975 | Plank et al. |
| 3,936,566 A | 2/1976 | Sato et al. |
| 3,965,209 A | 6/1976 | Butter et al. |
| 4,011,278 A | 3/1977 | Plank et al. |
| 4,035,285 A | 7/1977 | Owen et al. |
| 4,111,825 A | 9/1978 | Schulz et al. |
| 4,117,026 A | 9/1978 | Haag et al. |
| RE29,857 E | 12/1978 | Argauer et al. |
| 4,219,687 A | 8/1980 | Dolhyj et al. |
| 4,228,024 A | 10/1980 | Schulz et al. |
| 4,289,806 A | 9/1981 | Sato et al. |
| 4,306,106 A | 12/1981 | Kerr et al. |
| 4,365,103 A | 12/1982 | Chang et al. |
| 4,454,364 A | 6/1984 | Farcasiu et al. |
| 4,463,209 A | 7/1984 | Kursewicz et al. |
| 4,476,330 A | 10/1984 | Kerr et al. |
| 4,523,044 A | 6/1985 | Commandeur et al. |
| RE32,162 E | 5/1986 | Sato et al. |
| 4,642,730 A | 2/1987 | Sato et al. |
| 4,681,980 A | 7/1987 | Sato et al. |
| 4,686,548 A | 8/1987 | Takahashi et al. |
| 4,870,221 A | 9/1989 | Sato et al. |
| 4,895,988 A | 1/1990 | Clerici et al. |
| 4,899,009 A | 2/1990 | Kawakami et al. |
| 4,902,841 A | 2/1990 | Kawakami et al. |
| 4,982,025 A | 1/1991 | Kawakami et al. |
| 5,068,481 A | 11/1991 | Akatsi et al. |
| 5,073,655 A | 12/1991 | Angevine et al. |
| 5,171,906 A | 12/1992 | Kawakami et al. |
| 5,877,362 A | 3/1999 | Dohi et al. |
| 5,880,322 A | 3/1999 | Dohi et al. |
| 6,207,866 B1 | 3/2001 | Kawamata et al. |

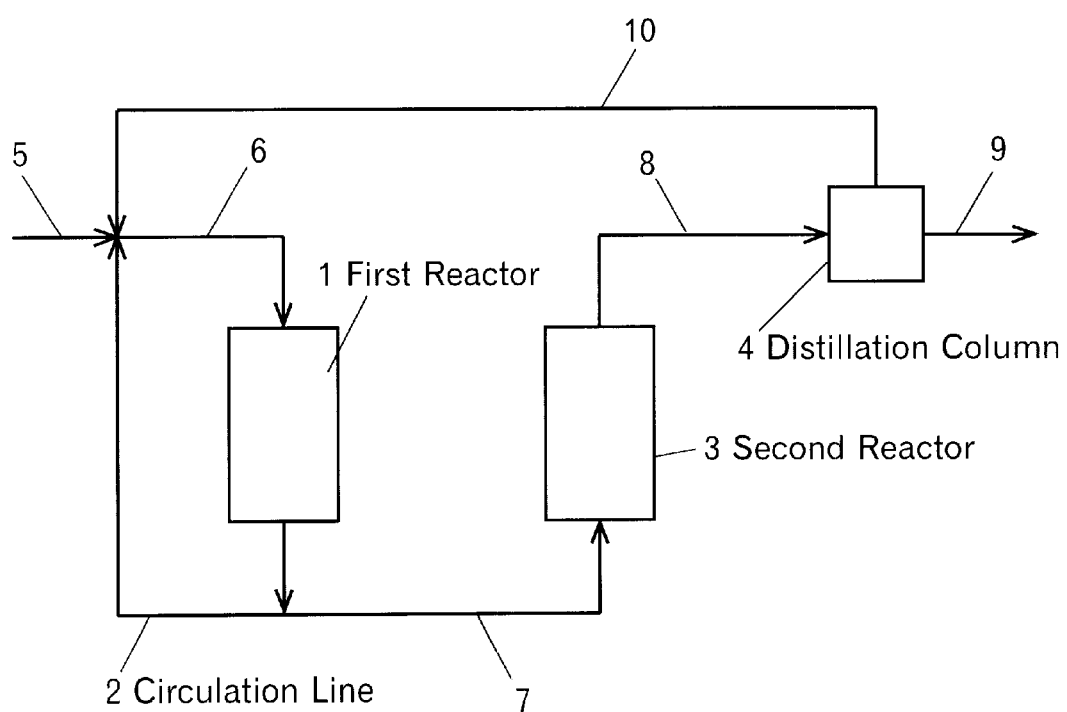

HYDROCARBON SOLVENT AND PRESSURE-SENSITIVE COPYING MATERIAL MADE WITH THE SAME

TECHNICAL FIELD

The present invention relates to a hydrocarbon solvent. More particularly, it relates to a hydrocarbon solvent comprising a fraction, which contains 1-phenyl-1-(p-isopropylphenyl)ethane that is obtained by reacting cumene and styrene, and a pressure-sensitive copying material, which is made with the above solvent.

BACKGROUND ART

It has hitherto been well known that the pressure-sensitive copying materials are prepared using various hydrocarbon solvents. For example, a sheet of paper (upper sheet) is applied with microcapsules enclosing a solution of an electron-donating color former (hereinafter referred to as "color former"), and another sheet of paper (substrate sheet) is applied with an electron-accepting substance (hereinafter referred to as "color developer") such as clay and polymeric materials which can produce colors upon reacting with the above color former. When copying materials are used, the treated surfaces of the above-mentioned set of sheets are put together face to face and pressure is applied to the paired sheets by handwriting or typewriting, thereby obtaining duplicate recordings.

The recording mechanism of this type is such that the microcapsules are ruptured by the pressure of handwriting or the impact of typewriting to release the color former solution. The solution comes into contact with the color developer on the opposite surface of the other sheet of paper to produce a color. In other types of known copying materials, both a lower layer of color developer and an upper layer of microcapsules are applied to a surface of a substrate sheet, or a mixture of microcapsules and a color developer is applied to a substrate sheet.

The color former solution that is used for the copying materials of this kind is a solution of an electron-donating color former in one or more kinds of hydrophobic solvents.

As this type of color former solvent, 1-phenyl-1-(isopropylphenyl)ethane is proposed in Japanese Laid-Open Patent Publication No. 48-92115. The above 1-phenyl-1-(isopropylphenyl)ethane is a satisfactory solvent because it is odorless and be excellent in color-developing property. In addition, it can be produced without difficulty by reacting cumene with styrene as disclosed in the above reference, and it is also favorable in industrial viewpoint because the cumene and styrene as starting materials are inexpensive.

As disclosed in the above publication, 1-phenyl-1-(isopropylphenyl)ethane may include three kinds of isomers, namely, o-, m- and p-isomers, according to the positions of isopropyl groups on the benzene ring. As the result of investigation by the present inventors, it was found out that p-isomer is most excellent in the solvent property for dyestuffs, in addition, it is low in viscosity. Therefore, it is high in color-developing rate, while the other isomers do not necessarily have these desirable properties.

The above-mentioned patent reference describes, with referring to British Patent No. 896864, that 1-phenyl-1-(isopropylphenyl)ethane can be produced easily by reacting cumene and styrene according to this method. However, the conventional catalyst containing acid-treated clay catalyst as proposed in the above British Patent is not always sufficient in the selectivity for producing p-isomer. Therefore, the 1-phenyl-1-(isopropylphenyl)ethane that is described in examples of the above patent is not always satisfactory in the solubility for dyestuffs, the color-developing rate and so forth, and besides, a large quantity of styrene dimers are produced as by-products.

It is also the case with the method described in Japanese Laid-Open Patent Publication No. 48-92114, in which sulfuric acid is used as a catalyst in the reaction of cumene and styrene, or with the method described in Japanese Laid-Open Patent Publication No. 49-31652, in which acid clay is used.

Furthermore, in the production of 1-phenyl-1-(isopropylphenyl)ethane by reacting styrene and cumene as described above, two kinds of styrene dimers are produced as by-products. In addition, these dimers differ from 1-phenyl-1-(isopropylphenyl)ethane in the number of carbon atoms by only one, therefore, the boiling points of them are close to each other. Accordingly, when distillation is employed for the separation in an industrial scale, the dimers are liable to be entrained into the fraction containing 1-phenyl-1-(isopropylphenyl)ethane.

The two kinds of styrene dimers produced as by-products are 1,3-diphenylbutene and 1-methyl-3-phenylindane. Between them, 1-methyl-3-phenylindane, particularly, sometimes produces undesirable effect on the odor of products.

The object of the present invention is to provide a hydrocarbon solvent which is inexpensive and has excellent properties, especially a hydrocarbon solvent consisting of 1-phenyl-1-(p-isopropylphenyl)ethane that is excellent in the dissolving power for dyes and color-developing rate, and is odorless without any problem. Another object of the invention is to provide a pressure-sensitive copying material that is made using the above solvent.

A first aspect of the present invention, therefore, relates to a hydrocarbon solvent characterized in that the solvent comprises a fraction which is produced by reacting styrene and cumene in the presence of an acid catalyst. The fraction contains 85% by weight or more of 1-phenyl-1-(p-isopropylphenyl)ethane and 5% by weight or less of total content of styrene dimers.

A second aspect of the present invention relates to a hydrocarbon solvent as described in the above first aspect, in which the weight ratio of 1,3-diphenylbutene to 1-methyl-3-phenylindane in the styrene dimers is 0.02 or less.

A third aspect of the present invention relates to a pressure-sensitive copying material, which comprises an electron-accepting color developer and a solution of electron-donating color former that is dissolved in a hydrocarbon solvent as described in the above first or second aspect, the color former producing a color when it is brought into contact with the above color developer.

A fourth aspect of the present invention relates to a pressure-sensitive copying material as described in the third aspect, which comprises microcapsules enclosing a solution of electron-donating color former and a sheet-like support carrying there on the microcapsules.

The present solvent contains a large quantity of the p-isomer of 1-phenyl-1-(isopropylphenyl)ethane, so that it is excellent in dissolving power for dyes and color-developing rate. Moreover, because the content of 1,3-diphenylbutene relative to the styrene dimers is small, disagreeable odor is not produced. Furthermore, because 1-phenyl-1-(isopropylphenyl)ethane according to the present invention can be produced without difficulty by reacting cumene with styrene, the obtained solvent is inexpensive.

DISCLOSURE OF INVENTION

In the following, the present invention will be described in more detail.

As the 1-phenyl-1-(isopropylphenyl)ethanes, there are three kinds of position isomers, in which isopropyl group occupies o-, m- and p-positions. That is, 1-phenyl-1-(o-isopropylphenyl)ethane, 1-phenyl-1-(m-isopropylphenyl) ethane, and 1-phenyl-1-(p-isopropylphenyl)ethane. Concerning the hydrocarbon solvent according to the present invention, it is most important that the content of the p-isomer of 1-phenyl-1-(p-isopropylphenyl)ethane in the whole solvent is 85% by weight or more. Both 1-phenyl-1-(o-isopropylphenyl)ethane and 1-phenyl-1-(m-isopropylphenyl)ethane are higher in viscosity than that of 1-phenyl-1-(p-isopropylphenyl)ethane, and their dissolving power for color formers used in pressure-sensitive copying material are smaller. Accordingly, if the content of 1-phenyl-1-(o-isopropylphenyl)ethane and 1-phenyl-1-(m-isopropylphenyl)ethane in the solvent exceeds 15% by weight, the properties as a pressure-sensitive copying material are unfavorably inferior to the hydrocarbon solvent of the present invention.

Furthermore, if the total amount of styrene dimers of 1,3-diphenylbutene and 1-methyl-3-phenylindane in the solvent is 5.0% by weight or more, the odor is too strong when it is used as a hydrocarbon solvent. This is unfavorable in the use for the preparation of pressure-sensitive copying material. Particularly, 1,3-diphenylbutene has a strong odor and produces disagreeable smell when it is mixed even in a trace amount.

Still further, if unsaturated hydrocarbons such as 1,3-diphenylbutene are mixed, it is apprehended that the heat stability and oxidation stability of the product of hydrocarbon solvent may be impaired. Therefore, it is preferable to avoid them from being get mixed as small as possible. In other words, in the solvent of the present invention, it is preferable to adjust the weight ratio of 1,3-diphenylbutene to 1-methyl-3-phenylindane to a level not higher than 0.02.

1-Phenyl-1-(isopropylphenyl)ethane can be produced by, for example, the well-known method described in Japanese Laid-Open Patent Publication No. 48-92114. However, with the conventionally known method, it is difficult to increase the content of isomer of 1-phenyl-1-(p-isopropylphenyl) ethane up to 85% by weight or more and to decrease simultaneously the content of styrene dimers of 1,3-diphenylbutene and 1-methyl-3-phenylindane in the whole composition to a level of 5% by weight or lower.

In the production of the solvent of the present invention, a solid acid catalyst having shape selectivity is suitable in order to react styrene with cumene. The catalyst is exemplified by crystalline zeolites such as Y-zeolite, ultra-stabilized Y-zeolite, mordenite, ZSM-5 and ZSM-12. By using these solid acid catalysts having shape selectivity, it is possible to suppress the formation of styrene dimers as by-products, especially 1-methyl-3-phenylindane.

The reaction is not limited so long as styrene and cumene are caused to react in a liquid phase. However, in order to produce the hydrocarbon solvent according to the present invention, the method as described in the following passage is preferable.

That is, a liquid mixture of styrene and cumene is fed into a two-stage reactor, in which the concentration of styrene in the starting materials is selected from the range of 0.5% to 70% by weight. By using a recycling method to circulate a part of the reaction product from a first reactor to the same reactor, the formation of 1,3-diphenylbutene and 1-methyl-3-phenylindane is suppressed as little as possible. The 1,3-diphenylbutene having strong odor in the reaction product from the first reactor is converted into 1-methyl-3-phenylindane by the reaction in a second reactor.

The preferable mode of the above two-stage reaction will be described more particularly.

The method comprises the following steps from (1) to (4) in order to add styrene to cumene.

Step (1): to bring cumene and styrene into contact with a solid acid catalyst in a liquid phase in a first flow-type fixed bed reactor so as to obtain a reaction mixture comprising unreacted components, cumene/styrene addition product, and unsaturated components, Step (2): to circulate a part of the reaction mixture flowing out of the first reactor into the same reactor, Step (3): to feed the remainder reaction mixture from the first reactor into a second reactor and bring it into contact with a solid acid catalyst in a liquid phase so as to decrease the unsaturated components in the reaction mixture, and Step (4): to carry out distillation of the reaction mixture to obtain a fraction mainly consisting of cumene/styrene addition product and smaller contents of unsaturated components.

By the above method, it is possible to obtain cumene/ styrene addition product containing smaller contents of unsaturated components, and to improve the yield of the above addition product.

In the following, the above steps will be described in more detail with reference to the attached drawing.

BRIEF DESCRIPTION OF THE DRAWING

The attached drawing is a flow sheet indicating a process suitable for producing the hydrocarbon solvent according to the present invention. The main part of the reaction equipment in the drawing comprises a first reactor 1, which has a flow-type fixed bed that is packed with a solid acid catalyst; a circulation line 2, which returns a part of the reaction mixture from the first reactor back to the inlet of the same reactor; and a second reactor 3, which is packed with a solid acid catalyst. The symbol "4" denotes a distillation column in the separation/refining step, which can separate and recover reusable starting materials if they remain unreacted.

Starting materials of cumene and styrene are supplied from a storage tank (not shown) into a line 5 with a transferring pump (not shown) in the form of a mixture that is prepared previously. The mixture of starting materials is joined with a circulating flow in the circulation line 2, and it is then fed into the first reactor 1. It is possible to feed cumene and styrene to the first reactor 1 through any other line. A reaction solvent can be used, but it is usually preferable to use the starting material of cumene itself as a solvent for reaction.

Concerning the mixing ratio of styrene and cumene that is supplied to the reaction system through the line 5, the concentration of styrene relative to the total of both components can be selected from the range of 0.5 to 70% by weight, preferably 5 to 50% by weight. The above-mentioned total of both components does not include the circulating flow through the circulation line 2.

As the first reactor, a flow-type reactor with a fixed bed of solid acid catalyst is employed. In order to attain appropriate heating, it is also possible to use, for example, an apparatus for circulating a heat medium. The reactor may be either a single tube system or an appropriate multi-tube system.

As the catalyst for the fixed bed, a solid acid catalyst having shape selectivity is suitable as mentioned in the foregoing. It is exemplified by zeolites such as Y-zeolite, ultra-stabilized Y-zeolite, mordenite, ZSM-5 and ZSM-12.

The reaction temperature can be selected in the range from 40 to 300° C.

Meanwhile, the reaction pressure can be so selected that the reaction system is in a liquid phase. For example, it can be usually selected in the range from 0.01 to 10 MPa.

The LHSV (liquid hourly space velocity) can be selected in the range from 0.1 to 200 $h^{-1}$ based on the flow rate of starting materials passing through the line 5.

In the first reactor, cumene and styrene are brought into contact with a solid acid catalyst in a liquid phase to produce a cumene/styrene addition product and unsaturated components as well. More particularly, the styrene is added to the cumene to produce 1-phenyl-1-(p-isopropylphenyl)ethane and unsaturated components are sinultaneously produced. These unsaturated components are mainly unsaturated styrene oligoiners, which include dimer to tetramer and the like. These unsaturated styrene oligomers have molecular weights and boiling points that are close to those of aromatic compound-styrene adducts. Therefore, they are liable to mix into the intended cumene/styrene addition product.

As described above, a reaction mixture comprising unreacted components of cumene and styrene, a cumene/styrene addition product and unsaturated components, flows out of the exit line of the first reactor.

According to the present invention, a part of the reaction mixture flowing out of the exit line of the first reactor is passed through the circulation line 2, and joined with starting materials through the line 5 and circulated to the first reactor 1 through a line 6. The circulating flow rate is preferably 1 to 99 parts by weight, more preferably 25 to 99 parts by weight relative to 100 parts by weight of the total flow rate of reaction mixture that is flowing out of the first reactor 1. The circulation can be carried out by an appropriate means for transferring such as a pump (not shown).

As described above, because the method to circulate a part of the reaction mixture is adopted in the first reactor, the concentration of styrene supplied through the line 5 can be maintained relatively high. As a result, the productivity is improved and the size reduction of equipment can be attained. On the other hand, although the concentration of styrene in the line 5 is high, the concentration of styrene in the first reactor can be maintained on a constant low level. Accordingly, the formation of unsaturated components can be suppressed in the first reactor.

Concerning the whole reaction mixture flowing out of the first reactor 1, the remaining part that is separated from the foregoing circulating flow is supplied to the second reactor 3 through a line 7 as shown in the figure. The supply is then brought into contact with a solid acid catalyst in a liquid phase. As shown in the figure, the product flowing out of the first reactor 1 may be supplied continuously to the second reactor 3. In another mode of operation, if necessary, the portion of remaining reaction mixture from the first reactor 1 is stored in a storage tank for reaction mixture (not shown) and after that, it may be supplied to the second reactor 3, this is called as block operation.

The main purpose of the provision of the second reactor 3 in the present invention comprises the following two points:

(1) By circulating a part of the product flowing out of the first reactor 1, the content of unreacted styrene in the reaction mixture from the first reactor increases. Thus, by bringing the reaction mixture into contact with the solid acid catalyst in a liquid phase in the second reactor 3, the unreacted styrene is caused to react again to advance the addition reaction. As a result, the yield of cumene/styrene addition product is improved as a whole.

(2) In the second reactor 3, unsaturated components produced in the first reactor 1, specifically unsaturated styrene oligomers, are alkylated into aromatic compounds or self-alkylated (cyclized) into products having benzene rings in molecules. In both alkylation and self-alkylation (cyclization) of cumene, unsaturated styrene oligomers are converted into saturated compounds having no unsaturated carbon-carbon double bond.

Therefore, by carrying out the reaction in the second reactor 3, the content of unsaturated components in the reaction mixture is decreased.

In the second reactor 3, the same catalyst as the one used in the foregoing first reactor 1, can be used. The catalyst is exemplified by crystalline zeolites having the function of what is called molecular sieve, such as Y-zeolite, ultra-stabilized Y-zeolite, mordenite, ZSM-5 and ZSM-12, synthetic or natural amorphous metal oxides such as clay and silica-alumina, and cation exchange resins such as cross-linked sulfonated polystyrene, e.g. Amberlyst (trade name: made by Rohm & Haas Co.) Among these catalysts, the solid acid catalysts substantially having no shape selectivity such as synthetic or natural amorphous metal oxides such as clay and silica-alumina, and cation exchange resins such as cross-linked sulfonated polystyrene are favorable, and the solid acid catalysts such as amorphous metal oxides are used more favorably.

The type of reaction in the second reactor 3 may be any of continuous and batch-wise, and any of stirring vessel and flow-type fixed bed may be used. A preferable one is a flow-type fixed bed like in the case of the above first reactor 1.

The reaction conditions can be selected from the same ranges as those in the first reactor 1. For example, the reaction temperature can be selected in the range from 40 to 300° C. The reaction pressure is so selected that the reaction is in a liquid phase. It is usually possible to select the pressure in the rage from 0.01 to 10 MPa. When a flow-type fixed bed is used, the LHSV is selected in the rage from 0.1 to 200 $h^{-1}$ based on the flow rate of starting materials that is passing through the line 5.

In the figure, an example is shown wherein a flow-type fixed bed is adopted as the second reactor 3. The product flowing out of the second reactor 3 is sent to the distillation column 4 through a line 8. After the distillation, a fraction containing the intended cumene/styrene addition product is taken out through a line 9. According to the present invention, the fraction containing cumene/styrene addition product such as diarylalkane containing little quantity of unsaturated components can be obtained easily by industrial separating means such as distillation.

In order to separate this fraction, ordinary industrial conditions can be employed. Specifically, by using a packed tower filled with appropriate packing material, the distillation is carried out, for example, with the theoretical number of separation stage in the range of 2 to 200, the reflux ratio of 0.1 to 50 and the pressure of 1 to 100 kPa. In the distillation column 4, cumene supplied in excess and, if necessary, unreacted styrene is separated and recovered, joined with the materials in the line 5 through a line 10, if necessary, and a storage tank (not shown), and circulated to the first reactor 1 through the line 6. Furthermore, in order to recover these unreacted components, the distillation column 4 can be of a multi-column type of series or parallel arrangement.

The fraction containing cumene/styrene addition product taken out of the line 9 is not low in heat stability and in oxidation stability because it contains less quantity of unsaturated components. In addition, according to the above production method using cumene and styrene as starting materials, styrene dimers having strong odor, especially 1,3-diphenylbutene, can be restrained from being mixed in the product. As a result, the product can be obtained, which is useful as various industrial solvents such as solvents for dyestuffs used for preparing a pressure-sensitive copying paper.

The hydrocarbon solvents according to the present invention is used not only independently but also by mixing together with other auxiliary solvents such as kerosene fraction, isoparaffinic solvent, n-paraffinic solvent, naphthenic solvent and alkylbenzene.

When the hydrocarbon solvents according to the present invention are used for pressure-sensitive copying materials such as pressure-sensitive copying paper, the electron-accepting color developers are not especially limited. For example, there are bentonite, zinc oxide, titanium oxide, kaolin, clay, activated clay, acid clay, zeolite, talc, colloidal silica and so forth. Furthermore, there are high molecular weight materials such as phenol resins, and aromatic carboxylic acids or their metal salts such as zinc salicylate, which have been increasingly used in recent years.

The colorless or light-colored electron-donating color formers which produce colors upon contact with the above color developers are not especially limited when they are used for pressure-sensitive copying materials such as pressure-sensitive copying paper. They are exemplified by triarylmethane base color former, diphenylmethane base color former, xanthene base color former, thiazine base color former, spiropyran base color former and so forth.

The examples of specific compounds of these color formers are as follows. Triarylmethane base color formers are exemplified by 3,3-bis(p-dimethylamino-phenyl)-6-dimethylaminophthalide (Crystal Violet Lactone, hereinafter referred to as "CVL", sometimes), 3,3-bis(p-dimethyl-aminophenyl)phthalide, 3-(p-di-methylaminophenyl)-3-(1,2-dimethylindol-3-yl)phthalide, 3-(p-dimethylamino-phenyl)-3-(2-methylindol-3-yl)phthalide, 3-(p-dimethyl-aminophenyl)-3-(2-phenyl-indol-3-yl)phthalide, 3,3-bis(1,2-dimethylindol-3-yl)-5-dimethylaminophthalide, 3,3-bis-(1,2-dimethylindol-3-yl)-6-dimethylaminophthalide, 3,3-bis(9-ethylcarba-zol-3-yl)-5-dimethylaminophthalide, 3,3-bis(2-phenylindol-3-yl)-5-dimethylaminophthalide, and 3-(p-dimethylaminophenyl)-3-(1-methylpyrrol-2-yl)-6-dimethyl-aminophthalide.

Diphenylmethane base color formers are exemplified by 4,4'-bis(dimethylamino)benzhydrine benzyl ether, N-halophenyl leuco Auramine, and N-2,4,5-trichlorophenyl leuco Auramine.

Xanthene base color formers are exemplified by Rhodamine B-anilino-lactam, Rhodamine B-(p-nitroanilino)lactam, Rhodamine B-(p-chloroanilino)-lactam, 3-dimethylamino-6-methoxyfluoran, 3-diethylamino-7-methoxyfluoran, 3-diethylamino-7-chloro-6-methylfluoran, 3-diethylamino-7-(acetylmethylamino)-fluoran, 3-diethylamino-7-(dibenzylamino)fluoran, 3-diethylamino-7-(methyl-benzylamino)fluoran, 3-diethylamino-7-(chloroethylmethylamino)fluoran, and 3-diethylamino-7-(diethylamino)fluoran.

Thiazine base color formers are exemplified by benzoyl leuco methylene blue and p-nitrobenzyl leuco methylene blue.

Spiropyran base color formers are exemplified by 3-methyl-spiro-dinaphthopyran, 3-ethyl-spiro-dinaphthopyran, 3,3'-dichloro-spiro-dinaphtho-pyran, 3-benzyl-spiro-dinaphthopyran, 3-methyl-naphtho-(3-methoxybenzo)-spiropyran, and 3-propyl-spiro-dibenzodipyran.

The above color formers are dissolved in a hydrocarbon solvent of the present invention for use, and the concentration of the solution is usually about 0.5 to 15% by weight.

Concerning the pressure-sensitive copying material according to the present invention such as the pressure-sensitive copying paper, a general production method will be described.

A solution containing the above color former dissolved in the present hydrocarbon solvent is emulsified in an aqueous solution of gelatin and gum arabic, and then gelatin membranes are formed around the emulsified oil particles by coacervation method to obtain microcapsules. Methods for forming resin membranes by interfacial polymerization or by in-situ polymerization are also widely used in recent years.

The thus obtained microcapsule emulsion of fine oil particles is applied to a sheet of paper, and a color developer is applied to the opposing surface of another sheet of paper or to the surface of the above emulsion coating in layers so as to prepare pressure-sensitive copying paper.

In the use of the pressure-sensitive copying paper, the microcapsules enclosing a dye solution are ruptured by the pressure of handwriting and the dye solution is brought into contact with the color developer to produce colors.

In another type one, the above microcapsule emulsion is applied to the surface of an ordinary sheet-like substrate material to form a pressure-sensitive copying material.

BRIEF DESCRIPTION OF DRAWING

The attached drawing is a flow sheet showing a process for producing a hydrocarbon solvent according to the present invention.

BEST METHOD FOR CARRYING OUT THE INVENTION

In the following, the present invention will be described specifically with reference to examples.

EXAMPLE 1

Using a zeolite catalyst having shape selectivity (trade name: β-zeolite, made by Mobil Oil Co.), cumene and styrene were caused to react with the above method to obtain a fraction containing mainly 1-phenyl-1-(isopropylphenyl)-ethane.

That is, according to the flow sheet shown, starting materials were supplied to a flow-type first reactor 1 having a fixed bed packed with the above zeolite catalyst. A part of the reaction mixture flowing out of the exit was returned to the inlet of the first reactor 1 through a circulation line 2, and another part of the reaction mixture was passed through a second reactor 3 packed with a solid acid catalyst. After that, the hydrocarbon solvent according to the present invention was recovered from a distillation column 4 as separation/refining step.

In the reaction, a starting material of cumene itself was used as solvent. As to the mixing proportion of styrene and cumene, the concentration of styrene relative to the total of both components was 8.7% by weight. The reaction temperature was 150° C., and the reaction pressure was 1 MPa so that the reaction phase could be kept liquid. The LHSV was 5 h$^{-1}$ based on the flow rate of starting materials passing through a line 5.

A part of the reaction mixture flowing out of the exit of the first reactor was passed through the circulation line 2, joined with starting materials in the line 5, and circulated to the first reactor 1 through a line 6. The circulating flow rate was 2,000 parts by weight relative to 100 parts by weight of the flow rate of starting materials passing through the line 5. Out of the whole reaction mixture flowing out of the first reactor 1, the remaining part separated from the circulating flow was supplied to the second reactor 3 through a line 7 shown in the figure. Then, it was brought into contact with a solid acid catalyst of silica-alumina (trade name: N632L, made by Nikki Chemical Co., Ltd.) in a fixed bed in the liquid phase.

In the second reactor, the reaction temperature was 150° C., and the reaction pressure was 0.5 MPa. The LHSV of 5 h$^{-1}$ was adopted based on the flow rate of starting materials passing through the line 5.

After that, the product was sent to the distillation column 4 through a line 8 and distilled to obtain a fraction containing the intended cumene/styrene addition product out of a line 9. In order to separate and obtain this fraction, industrially feasible ordinary conditions were adopted, that is, distillation was carried out with a packed tower using the number of separation steps of 60, the reflux ratio of 20 and the pressure of 3.3 kPa.

The thus recovered fraction containing mainly 1-phenyl-1-(isopropyl-phenyl)ethane had the boiling point in the range of 299 to 310° C. (at normal pressure) and the kinematic viscosity of 4.5 cSt at 40° C.

As the result of analysis, the contents of main components were 0.3% by weight of 1-phenyl-1-(o-isopropylphenyl) ethane, 3.6% by weight of 1-phenyl-1-(m-isopropylphenyl) ethane and 91.4% by weight of 1-phenyl-1-(p-isopropylphenyl)-ethane. The contents of 1-methyl-3-phenylindane and 1,3-diphenylbutene were 2.8% by weight and a trace, respectively.

As to the above hydrocarbon solvent, the strength of odor was estimated by 30 panelists. The results were indicated with 3 grades of "strong", "rather strong" and "weak". The results are shown in Table 1.

Comparative Example 1

The sample was prepared by mixing several compounds synthesized separately in the following proportion.

| | |
|---|---|
| 1-Phenyl-1-(o-isopropylphenyl)ethane | 0.4% by weight |
| 1-Phenyl-1-(m-isopropylphenyl)ethane | 7.0% by weight |
| 1-Phenyl-1-(p-isopropylphenyl)ethane | 83.0% by weight |
| 1-Methyl-3-phenylindane | 5.1% by weight |
| 1,3-Diphenylbutene | trace |
| Total | 95.5% by weight |

The structures of remaining components are unknown. The results of estimating the strength of odor are shown in Table 1.

Comparative Example 2

The sample was prepared by mixing several compounds synthesized separately in the following proportion.

| | |
|---|---|
| 1-Phenyl-1-(o-isopropylphenyl)ethane | 0 |
| 1-Phenyl-1-(m-isopropylphenyl)ethane | 0 |
| 1-Phenyl-1-(p-isopropylphenyl)ethane | 98.1% by weight |
| 1-Methyl-3-phenylindane | trace |
| 1,3-Diphenylbutene | 1.1% by weight |
| total | 99.2% by weight |

The structures of remaining components are unknown. The results of estimating the strength of odor are shown in Table 1.

TABLE 1

Comparison of Strength of Odor

| | Designation | | |
|---|---|---|---|
| | Content of Styrene Dimer (% by weight) | | |
| Example | 1-methyl-3-phenylindane | 1,3-diphenyl-butene | Strength of Odor |
| Ex. 1 | 2.8 | Trace | Weak |
| Comp. Ex. 1 | 5.1 | Trace | Rather Strong |
| Comp. Ex. 2 | Trace | 1.1 | Strong |

EXAMPLE 2

Using the hydrocarbon solvent obtained in Example 1, quantities of dissolved dyes were determined. The selected dyes were those for pressure-sensitive copying paper, namely, CVL (made by Yamada Chemical Co., Ltd.) generally used as a blue dye and One Dye Black (sometimes referred to as "ODB", made by Yamamoto Chemicals, Inc.) used as a black dye.

According to the measuring method, 0.25 g of a dye is added to 100 g of each solvent kept at 100° C. while stirring. When the dye is dissolved completely within 5 minutes after adding, the dye is added again. When it is confirmed by visual observation that the dye is not dissolved any more, the measurement is stopped, and the total weight of added dye is reported as quantity of dissolved dye. The results are shown in Table 2.

Comparative Example 3

Using the hydrocarbon solvent having the following composition, the quantity of dissolved dye was measured in the same way as that in Example 2.

| | |
|---|---|
| 1-Phenyl-1-(o-isopropylphenyl)ethane | 6.5% by weight |
| 1-Phenyl-1-(m-isopropylphenyl)ethane | 38.2% by weight |
| 1-Phenyl-1-(p-isopropylphenyl)ethane | 54.1% by weight |
| total | 98.8% by weight |

The structures of remaining components are unknown. The results are shown in Table 2.

Comparative Example 4

Using the hydrocarbon solvent having the following composition, the quantity of dissolved dye was measured in the same way as that in Example 2.

| | |
|---|---|
| 1-Phenyl-1-(o-isopropylphenyl)ethane | 3.5% by weight |
| 1-Phenyl-1-(m-isopropylphenyl)ethane | 35.1% by weight |
| 1-Phenyl-1-(p-isopropylphenyl)ethane | 60.2% by weight |
| total | 98.8% by weight |

The structures of remaining components are unknown. The results are shown in Table 2.

TABLE 2

Dissolving power for dyes Test

Designation

| | Composition of Main Components (% by weight) | | | Quantity of Dissolved Dye (g/100 g-solvent) | |
|---|---|---|---|---|---|
| Example | A[(1)] | B[(2)] | C[(3)] | CVL | ODB |
| Ex. 2 | 0.3 | 3.6 | 91.4 | 12.5 | 6.75 |
| Comp. Ex. 3 | 6.5 | 38.2 | 54.1 | 10.5 | 6.00 |
| Comp. Ex. 4 | 3.5 | 35.1 | 60.2 | 8.50 | 4.50 |

Notes
[(1)]A: 1-phenyl-1-(o-isopropylphenyl)ethane
[(2)]B: 1-phenyl-1-(m-isopropylphenyl)ethane
[(3)]C: 1-phenyl-1-(p-isopropylphenyl)ethane

EXAMPLE 3

A color former of CVL was dissolved in the hydrocarbon solvent obtained in Example 1 to obtain a solution of color former of 5% by weight. This color former solution was microcapsulated by means of in-situ polymerization with the conventional method.

The obtained microcapsule emulsion was applied to one sheet of fine quality paper to obtain an upper sheet. On the other hand, a substrate sheet was prepared by applying zinc salicylate as color developer. The surface coated with microcapsule of the upper sheet was put on the surface coated with a color developer of the substrate sheet, and the color was developed all over the sheet using a high pressure press.

At 20 seconds and 60 minutes after pressing, the reflectance of the substrate sheet was measured by a reflective spectrophotometer to determine the color density. The measurement was carried out at the temperature of 23° C. and −3° C. The color density was determined by the following formula, which shows that the larger value of color density corresponds to the deeper color. The results are shown in Table 3.

$$\text{Color Density (\%)} = 100 \times (I_0 - I)/I_0$$

wherein I: reflectance after color development, $I_0$: reflectance before color development.

Comparative Example 5

The color densities when used as pressure-sensitive copying paper were measured in the same way as that in Example 3 except that the same hydrocarbon solvent as that in Comparative Example 3 was used. The results are shown in Table 3.

Comparative Example 6

The color densities when used as pressure-sensitive copying paper were measured in the same way as that in Example 3 except that the same hydrocarbon solvent as that in Comparative Example 4 was used. The results are shown in Table 3.

TABLE 3

Color Density as Pressure-Sensitive Copying Paper

| | Designation Color Density (%) | | | |
|---|---|---|---|---|
| | 23° C. | | −3° C. | |
| Example | after 20 sec | after 60 min | after 20 sec | after 60 min |
| Ex. 3 | 76 | 80 | 47 | 75 |
| Comp. Ex. 5 | 75 | 79 | 49 | 76 |
| Comp. Ex. 6 | 73 | 78 | 43 | 72 |

Examples are recognized to be superior to Comparative Examples in both odor and dissolving power for dyes, and not inferior in color-developing property.

Industrial Applicability

The hydrocarbon solvent according to the present invention has little odor and is excellent in dissolving power for dyes, therefore it is suitable as a solvent for the pressure-sensitive copying paper. In this use, the above solvent is excellent especially in color-developing rate. Furthermore, the hydrocarbon solvent according to the present invention has the characteristics as follows:

(A) innoxious,
(B) inexpensive,
(C) no disagreeable odor,
(D) solvent itself is colorless or in very slight color,
(E) non-volatile,
(F) good solvent property for color formers,
(G) stability of color former solution is good,
(H) stable fine dispersion is formed in microcapsulation,
(I) microcapsule coating film is formed on the surfaces of the dispersion,
(J) good storage stability of microcapsules,
(K) microcapsule coating film is formed evenly over oil drops in an intended thickness,
(L) the rate of color-developing reaction between color former and color developer is high without inhibition of the reaction,
(M) when a polymer material as color developer is applied to a sheet of paper, the solvent dissolves the polymer material to cause the closer contact of the color developer with color former,
(N) produced color images are clear without bleeding, and
(O) produced color images are maintained clear even after a long storage period.

What is claimed is:

1. A hydrocarbon solvent comprising a fraction which is obtained by reacting styrene and cuene in the presence of an acid catalyst and contains 85% by weight or more of 1-phenyl-1-(pisopropylphenyl)ethane and 5% by weight or less of total styrene dimers.

2. A hydrocarbon solvent as claimed in claim 1 wherein the weight ratio of 1,3-diphenylbutene to 1-methyl-3-phenylindane in said styrene dimer is 0.02 or less.

3. A pressure-sensitive copying material, which comprises an electron-accepting color developer and a solution of electron-donating color former being dissolved in the hydrocarbon solvent as claimed in claim 1, said color former producing a color when it is brought into contact with said color developer.

4. A pressure-sensitive copying material as claimed in claim 3, which comprises microcapsules enclosing said solution of electron-donating color former and a sheet-like substrate material carrying thereon said microcapsules.

5. A pressure-sensitive copying material, which comprises an electron-accepting color developer and a solution of electron-donating color former being dissolved in the hydrocarbon solvent as claimed in claim 2, said color former producing a color when it is brought into contact with said color developer.

6. A pressure-sensitive copying material as claimed in claim 5, which comprises microcapsules enclosing said solution of electron-donating color former and a sheet-like substrate material carrying thereon said microcapsules.

* * * * *